(12) United States Patent
Palos

(10) Patent No.: US 11,354,011 B2
(45) Date of Patent: Jun. 7, 2022

(54) SNAPPING RANGE FOR AUGMENTED REALITY

(71) Applicant: GOOGLE LLC, Mountain View, CA (US)

(72) Inventor: Xavier Benavides Palos, San Francisco, CA (US)

(73) Assignee: GOOGLE LLC, Mountain View, CA (US)

(*) Notice: Subject to any disclaimer, the term of this patent is extended or adjusted under 35 U.S.C. 154(b) by 0 days.

(21) Appl. No.: 17/250,122

(22) PCT Filed: Dec. 4, 2019

(86) PCT No.: PCT/US2019/064483
§ 371 (c)(1),
(2) Date: Dec. 1, 2020

(87) PCT Pub. No.: WO2021/112839
PCT Pub. Date: Jun. 10, 2021

(65) Prior Publication Data
US 2021/0318790 A1    Oct. 14, 2021

(51) Int. Cl.
*G06F 3/04812*    (2022.01)
*G06F 3/04815*    (2022.01)
*G06F 3/01*    (2006.01)

(52) U.S. Cl.
CPC ...... *G06F 3/04812* (2013.01); *G06F 3/04815* (2013.01); *G06F 3/011* (2013.01)

(58) Field of Classification Search
CPC .. G06F 3/04812; G06F 3/04815; G06F 3/011; G06F 3/0488; G06T 19/006
See application file for complete search history.

(56) References Cited

U.S. PATENT DOCUMENTS

| 2008/0150965 A1* | 6/2008 | Bischoff | G06T 7/70 345/632 |
| 2016/0189426 A1 | 6/2016 | Thomas et al. | |
| 2018/0045963 A1 | 2/2018 | Hoover et al. | |
| 2019/0237044 A1* | 8/2019 | Day | G09G 5/08 |

OTHER PUBLICATIONS

International Search Report and Written Opinion for PCT Application No. PCT/US2019/064483, dated Aug. 18, 2020, 8 pages.

* cited by examiner

*Primary Examiner* — Mark W Regn
(74) *Attorney, Agent, or Firm* — Brake Hughes Bellermann LLP

(57) ABSTRACT

A position of a cursor may be detected within an augmented reality (AR) display of a physical space captured by a camera. A snapping range of a snap-select function of the cursor may be dynamically changed in response to the position of the cursor. Accordingly, a user may place or hold a camera in a location to view an associated AR display, and may easily and precisely execute a snap-select function to select a desired AR object, even when the AR display includes AR objects that are of different sizes, or are different distances from the camera.

18 Claims, 5 Drawing Sheets

SNAPPING RANGE FOR AUGMENTED REALITY

CROSS REFERENCE TO RELATED APPLICATION

This application is a 35 U.S.C. § 371 National Phase Entry Application from PCT/US2019/064483 filed Dec. 4, 2019, designating the U.S., the disclosure of which is incorporated herein by reference in its entirety.

BACKGROUND

Content may be inserted into an image or a user's field of view or otherwise tracked within a three-dimensional (3D) environment. For example, an augmented reality (AR) system may generate an augmented environment for a user by inserting content. The augmented environment can be generated by superimposing computer-generated content on a user's field of view of the real world. For example, the computer-generated content can include labels, textual information, images, sprites, and three-dimensional entities. The computer-generated content may be displayed at a position in the user's field of view so as to appear to overlay an object in the real world and be spatially retained relative to the real world even when outside of the user's field of view. Similarly, the computer-generated content may be overlaid on a displayed image. Various properties may be used to display the computer-generated content in a particular environment.

SUMMARY

This disclosure describes systems and methods for managing properties that are used in displaying inserted content. For example, the inserted content may be displayed using a content display property entity that is associated with a physical location and at least one content display property.

According to one general aspect, a non-transitory computer-readable storage medium may include instructions stored thereon. When executed by at least one processor, the instructions may be configured to cause a computing system to at least detect a position of a cursor within an AR display of a physical space captured by a camera, the AR display including an AR object, and the position simulating a three-dimensional position of the cursor within the physical space and relative to the camera and the AR object. When executed by the at least one processor, the instructions may also cause the computing system to change a snapping range of a snap-select function of the cursor in response to the position of the cursor.

According to another general aspect, a method includes detecting a position of a cursor within an AR display of a physical space captured by a camera, the AR display including an AR object, and the position simulating a three-dimensional position of the cursor within the physical space and relative to the camera and the AR object. The method further includes changing a snapping range of a snap-select function of the cursor in response to the position of the cursor.

According to another general aspect, a system includes at least one processor; and memory storing instructions that, when executed by the at least one processor, cause the system to detect a position of a cursor within an AR display of a physical space captured by a camera, the AR display including an AR object, and the position simulating a three-dimensional position of the cursor within the physical space. When executed by the at least one processor, the instructions may further cause the system to determine, from the position of the cursor, a distance of the cursor from the camera within the AR display, and change a snapping range of a snap-select function of the cursor based on the distance of the cursor from the camera.

The details of one or more implementations are set forth in the accompanying drawings and the description below. Other features will be apparent from the description and drawings, and from the claims.

Figure 1:
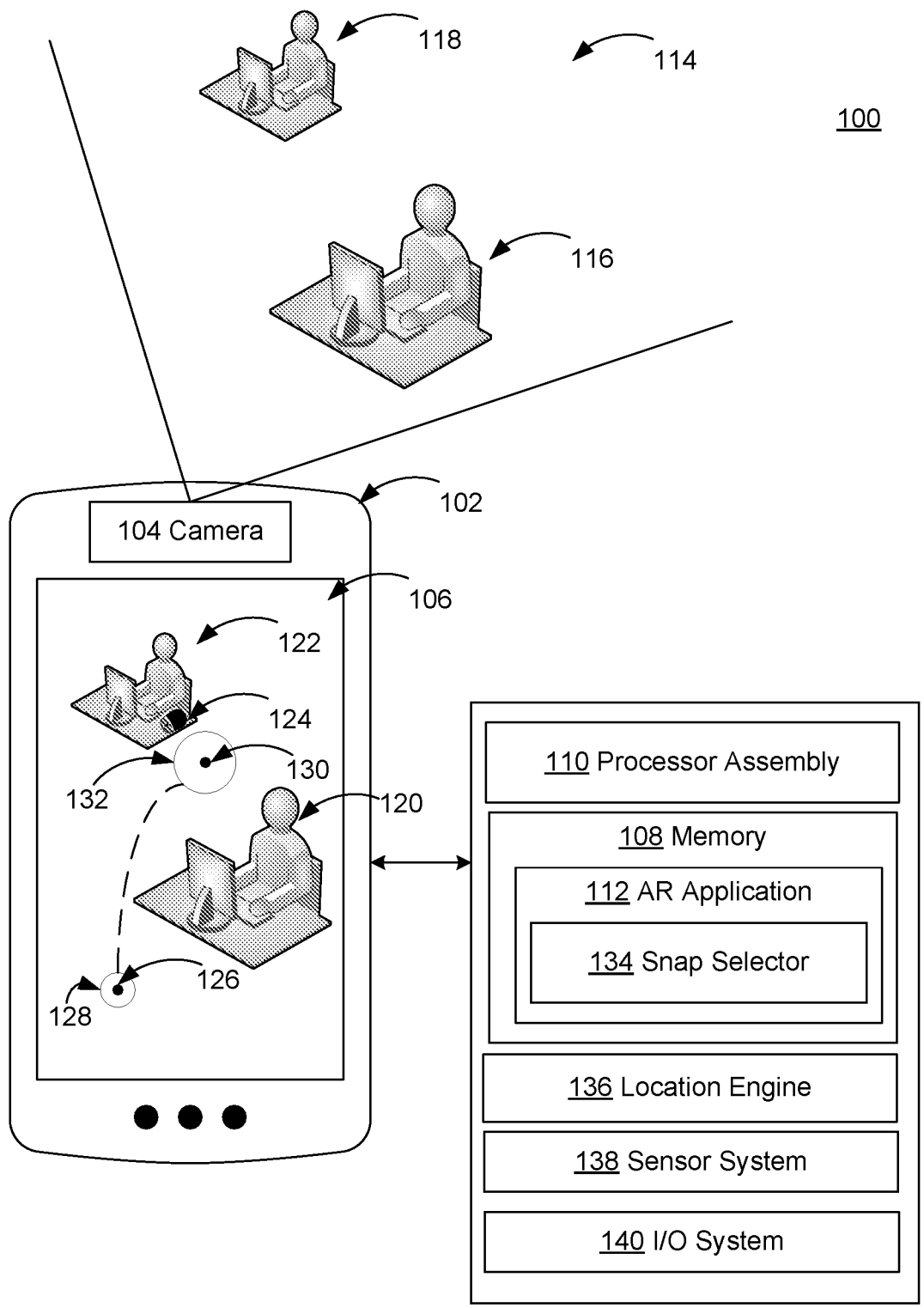
FIG. 1 is a block diagram illustrating a system according to an example implementation.

Reference will now be made in detail to non-limiting examples of this disclosure, examples of which are illustrated in the accompanying drawings. The examples are described below by referring to the drawings, wherein like reference numerals refer to like elements. When like reference numerals are shown, corresponding description(s) are not repeated and the interested reader is referred to the previously discussed figure(s) for a description of the like element(s).

DETAILED DESCRIPTION

Augmented reality (AR) systems include systems that insert computer-generated content into a user's perception of the physical space surrounding the user. The computer-generated content may include labels, textual information, images, sprites, and three-dimensional entities. In some implementations, the content is inserted for entertainment, educational, or informational purposes.

An example AR system is a portable electronic device, such as a smartphone, that includes a camera and a display device. The portable electronic device may capture images using the camera and show AR images on the display device, which may be referred to as an AR display. The AR images may include computer-generated content overlaid upon the images captured by the camera.

Another example AR system includes a head-mounted display (HMD) (e.g., wearable goggles or glasses) that is worn by a user. The HMD includes a display device that is positioned in front of a user's eyes. For example, the HMD may occlude the user's entire field of view so that the user can only see the content displayed by the display device. In some examples, the display device is configured to display two different images, one that is viewable by each of the user's eyes. For example, at least some of the content in one of the images may be slightly offset relative to the same content in the other image, so as to generate the perception of a three-dimensional scene due to parallax. In some implementations, the HMD includes a chamber in which a portable electronic device, such as a smartphone, may be placed so as to permit viewing of the display device of the portable electronic device through the HMD.

Another example AR system includes a HMD that permits the user to see the physical space while the HMD is being worn. The HMD may include a micro-display device that displays computer-generated content that is overlaid on the user's field of view. For example, the HMD may include an at least partially transparent visor that includes a combiner that permits light from the physical space to reach the user's eye while also reflecting images displayed by the micro-display device toward the user's eye.

AR systems are frequently designed to enable interaction between the displayed AR content and a user of the AR system. To initiate or facilitate such interactions, it may be necessary for the user to first select desired AR content, e.g., from among all available AR content being displayed at the time of selection.

In order to enable such selection of a particular AR object from among displayed AR content, AR systems may provide a cursor or other selection indicator. AR systems provide the user with an ability to move the cursor within an AR display, i.e., within a displayed, augmented view of the user's physical space. The user may thus be provided with an ability to move the cursor within the AR display, and to select AR content.

For example, the user may move the cursor to overlay a specific AR object, whereupon the AR system may be configured to recognize that such overlay has occurred, and to thereafter provide an indication of selection of the overlaid AR object. For example, the AR system may highlight, designate, or otherwise indicate within the AR display that the overlaid AR object has been selected.

Following such selection, the user may proceed to execute any desired, available action with respect to the selected AR object. For example, the user may edit, copy, or delete the AR object, or may move or re-size the AR object.

In many scenarios, however, it may be difficult for the user to perform a desired selection of AR content. For example, as referenced above, AR displays are generally designed to represent or simulate three-dimensional (3D) physical spaces, even on two-dimensional (2D) display screens, so that displayed, overlaid AR content appears to be distributed within the physical space being displayed. In other words, particular AR objects may appear to be closer to, or farther from, a camera being used to capture images of the physical space. Further, AR objects may be different sizes than one another, and, as with any object within the physical space, may appear relatively larger or smaller depending on a relative distance from the camera.

As a result of these and other factors, for example, a user may struggle to select a distant AR object within an AR display. Put another way, a precision of a cursor-based selection function may be reduced, and a user may be required to make several attempts to achieve a successful selection. In some cases, the user may be required to physically move a camera closer to the simulated location of the AR object, e.g., by walking in a direction of the AR object, to make the AR object appear larger and easier to select.

In contrast, using the techniques described herein, a user may place or hold a camera in a single location to view an associated AR display, and may easily and precisely execute a snap-select function to select a desired AR object, even when the AR display includes AR objects that are of different sizes, or are different distances from the camera. More particularly, the described techniques may be instrumental in detecting a position (e.g., a placement, or a movement) of a cursor within an AR display of a physical space captured by a camera. The position of the cursor may simulate a three-dimensional position of the cursor within the physical space and relative to the camera and the AR object. Then, the described techniques may change a snapping range of a snap-select function of the cursor, in response to the position of the cursor.

For example, as the cursor moves toward or away from the camera, the snapping range may decrease or increase, respectively. The snapping range may increase when the cursor is placed next to, or moved towards, a relatively larger AR object, as compared to being positioned for snap-selection of a relatively smaller AR object.

A snapping range of a cursor may also be dependent on a size of the cursor itself within the AR display. For example, a snapping range for a cursor may increase as the cursor size decreases, and may decrease as the cursor size increases.

Using these and other techniques, it is possible to increase a precision of a cursor-based snap-select function, based at least on some or all of the above factors, or other factors, or combinations thereof. Such increases in precision may be obtained without requiring a user to move within a physical space. Moreover, the described techniques may be performed without requiring explicit user input to change a snapping range, thereby further facilitating an ease with which a user may operate an AR system.

FIG. 1 is a block diagram illustrating a system 100 according to an example implementation. The system 100 generates an augmented reality (AR) environment for a user of the system 100. In some implementations, the system 100 includes a smartphone 102, or other hardware platform or device, which itself includes, or is in communication with, a camera 104 and a display 106. For example, as referenced above, alternative types of hardware platforms may include various implementations of head-mounted systems with integrated camera and display. In other implementations, the camera 104 and the display 106 may be provided using separate hardware platforms, such as when a camera transmits to a separate display device.

The smartphone 102 includes various hardware elements, some of which are illustrated and described below for purposes of understanding example operations of the system 100. For example, as shown by separate call-out from the smartphone 102, the smartphone 102 may include memory 108, which may include one or more non-transitory computer-readable storage media. The memory 108 may store instructions and data that are usable to generate an AR environment for a user. A processor assembly 110 includes one or more processors and related devices that are capable of executing instructions, such as instructions stored by the memory 108, to perform various tasks associated with generating an AR environment. For example, the processor assembly 110 may include a central processing unit (CPU) and/or a graphics processor unit (GPU). For example, if a GPU is present, some image/video rendering tasks, such as adjusting and rendering content using display parameters from a display management engine, may be offloaded from the CPU to the GPU.

The memory 108 and the processor assembly 110 may thus be used to execute an AR application 112. As described in detail, below, the AR application 112 may present or provide AR content to a user via the display 106, and/or one or more output devices, such as speakers. In some implementations, the AR application 112 includes instructions stored in the memory 108 that, when executed by the processor assembly 110, cause the processor assembly 110 to perform the operations described herein. For example, the AR application 112 may generate and present an AR environment to the user based on, for example, AR content. The AR content may include objects that overlay various portions of a physical space 114. The AR content may be rendered as flat images or as three-dimensional (3D) objects.

More specifically, for purposes of the simplified example of FIG. 1, the device 102 is a smartphone with integrated camera 104 and display 106, where the camera 104 may be directed to capture images of the physical space 114. The physical space 114 may include any area that the camera 104 is capable of capturing, but again for purposes of simplified example, is illustrated as including a first deskworker 116 and a second deskworker 118. In the example, the deskworkers 116, 118 are the same physical size, but the deskworker 118 appears smaller due to being located at a greater distance from the camera 104 than the deskworker 116.

Within the display 106, which is a display screen in the example of FIG. 1 but may represent any AR display, the first deskworker 116 is captured and displayed as first deskworker image 120, while the second deskworker 118 is captured and displayed as second deskworker image 122. As an example of AR content that may be overlaid or otherwise included within the AR display 106, an AR object is represented as an AR computer mouse 124.

In FIG. 1, a cursor 126 is represented as a dot, or circle. In other implementations, a cursor may be used for selection purposes having any suitable shape, such as an arrow or other pointer. The cursor 126 may be referred to using any suitable nomenclature, e.g., may be referred to as a selector, or reticle.

To implement a snap-select function for purposes of the AR application 112, as described herein, the cursor 126 may be associated with a snapping range that is illustrated in FIG. 1 as circle 128. As referenced, the snapping range 128 is a distance from the cursor 126 at which snap selection of an AR object occurs, as the cursor 126 is moved through the AR display 106.

Figure 2:
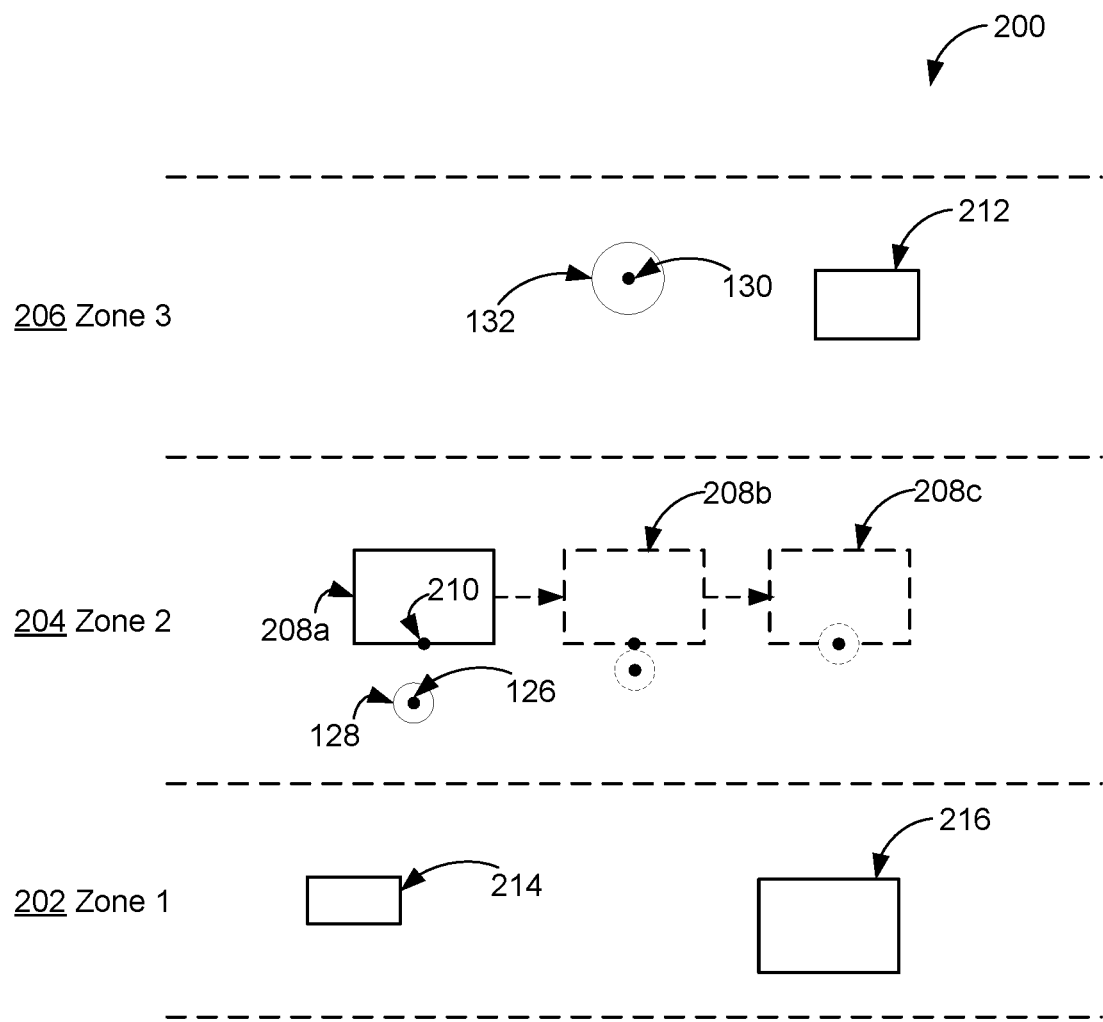
FIG. 2 is a block diagram illustrating a more detailed example implementation of the system of FIG. 1.

As described and illustrated in more detail with respect to FIG. 2, each selectable AR object, such as the AR object 124, may include, or be associated with, one or more snap locations. Once the cursor 126 moves to within the snapping range of such a snap location, e.g., once an edge of the circle 128 touches a snap location of an AR object, the AR application 112 automatically snaps the cursor 126 to the snap location, and thus selects the AR object 124. Thereafter, a user may edit or otherwise manipulate the selected AR object 124, or, if desired, may unsnap the cursor 126 to proceed with a different snap selection.

In the system 100, the snapping range 128 is dynamically adjustable within the AR display 106, based on its position within the AR display 106 relative to the camera 104, the AR object 124, and/or other factors, as described herein. By virtue of such dynamic adjustment, a precision of the snap-select function may be increased over a wide range of use case scenarios, such as selecting AR objects located distantly (e.g., at a greater depth or distance) from the camera 104 within the AR display, or selecting among AR objects that differ in relative size.

For example, in FIG. 1, the cursor 126 is illustrated as being moved from a position by the first deskworker image 120 to a position by the second deskworker image 122, at which point the cursor 126 is separately labeled as cursor 130, for purposes of disambiguation. Thus, the cursor 126/130 may be said to move to a position that is farther from the camera 104 within the AR display 106.

In other words, the AR display 106, by definition, maintains spatial coordinates, spatial relationships, and/or other absolute or relative location information with respect to images of the physical space 114. Therefore, just as the second deskworker 118 is farther from the camera 104 than the first deskworker 116 within the physical space 114, the second deskworker image 122 may be understood to be, or referred to as being, farther from the camera 104 than the first deskworker image 120. Consequently, the cursor 130 is referenced as being farther from the camera 104 than the cursor 126.

As in any 3D space or 3D image, objects that are farther away appear to be smaller, so that the AR object 124 appears smaller within the AR display 106 than if it were placed next to the first deskworker image 120. As a result, and as described in more detail, below, a precision of the cursor 130, relative to the AR object 124 and/or to that of the cursor 126, may be lower.

To compensate for such lowered precision, as illustrated, a snapping range 132 of the cursor 130 is dynamically increased, as compared to the snapping range 128 of the cursor 126. Consequently, it is easier for a user to position the cursor 130 within the snapping range 128 with respect to the AR object 124, or, put another way, it is easier for the user to snap-select the AR object 124.

In order to provide dynamic adjustment of a snapping range as just described (and/or based on other factors, such as a relative size of the AR object 124, or a size of the cursor 126/130, as described herein), the AR application 112 may include a specialized snap selector 134, as described in more detail, below, with respect to FIG. 2. The AR application 112, and thus the snap selector 134, may include, utilize, or otherwise have access to, various types of hardware and/or software features that may be instrumental in performing the functions of the system 100.

For example, a location engine 136 may be configured to determine physical location information relevant to the physical space 114 and thus the AR display 106. For example, such determinations may be based on a coordinate system being mapped to the captured images based on determining a location of the AR system based on using, for example, a visual positioning system or global positioning system. When AR content is identified to insert, the AR content may be adjusted based on display properties of the AR display 106, with respect to the size and location information determined, at least in part, by the location engine 136.

In some implementations, the AR application 112 may also use a sensor system 138 to determine a location and orientation of a user within the physical space 114, and/or to recognize features or objects within the physical space 114, perhaps in conjunction with coordinate or other positional information from the location engine 136. The sensor system 138 may include the camera 104, as well as other sensors, including, for example, an inertial motion unit (IMU), a light sensor, an audio sensor, an image sensor, a distance sensor, a proximity sensor, a contact sensor such as a capacitive sensor, a timer, and other sensors or different combinations of sensors.

For example, the AR application may construct a model of the physical space 114 from images taken by the camera 104, and other available information from the sensor system 138 and otherwise. The AR application 112 may include, or utilize (using suitable Application Program Interfaces (APIs)), a development platform or toolkit to detect the size and location of surfaces, including horizontal, vertical and angled surfaces (e.g., the ground, a table, or walls). Using determined edges and depth information, these various surfaces may be joined into a three-dimensional (3D) model to for AR purposes. Other helpful or necessary features, such as motion tracking or light estimation, also may be utilized to construct or modify the resulting 3D model.

The AR application 112 may use an I/O system 140 to receive a user input to control the cursor 126 or otherwise to operate the smartphone 102. For example, the I/O system 140 may provide for gesture commands, voice commands, actuation of a button, or other type of input that provides a user with an ability to move and otherwise utilize the cursor 126. In various implementations, a nature of the I/O system 140 will depend on a nature of the overall AR system 100, including the camera 104, the AR display 106, and the cursor 126. For example, when the device 102 is a smartphone, the I/O system 140 may enable a touchscreen interface for control and movement of the cursor 126.

Thus, as referenced, the snap selector 134 may be understood to have access to the various described components of the AR system 100, and other standard AR components that may be useful in implementing the AR system 100 of FIG. 1, but that are not explicitly illustrated therein. More detailed discussion of example operations of the snap selector 134 is provided below, e.g., with respect to FIG. 2.

For example, in FIG. 2, an AR display 200 is illustrated that corresponds to a physical space in the manner described above with respect to the AR display 106 and the physical space 114. In the example of FIG. 2, various distances are illustrated as a plurality of pre-defined distance zones, including a first zone 202, a second zone 204, and a third zone 206.

As may be appreciated from the above description of FIG. 1, the zones 202-206 may represent three distance ranges relative to the camera 104 within the physical space 114, and reflected within the corresponding AR display 200 of FIG. 2 as corresponding, simulated distances. For example, the first zone 202 may represent a distance range from 0-a meters from the camera 104, the second zone 204 may represent a distance range from a-b meters from the camera 104, and the third zone 206 may represent a distance range from b-c meters from the camera 104.

In a first example aspect of the example of FIG. 2, an AR object 208a is illustrated as a simple rectangle. As shown, the AR object 208a includes a snapping location 210, to which the cursor 126 will snap once the cursor 126 is within the snapping range 128 of the snapping location 210.

In FIG. 2, dashed-line AR objects 208b and 208c are provided to illustrate this snap selection action. Therefore, the dashed-line AR objects 208b and 208c provide a time-lapse representation of the AR object 208a, and do not represent separate AR objects. As shown, and as just referenced, movement of the cursor 126 adjacent to the AR object 208b and within the snapping range 128 results in execution of a snap-select function by the snap selector 134. Results of the snap-select function are illustrated with respect to AR object 208c, in which the cursor 126 is snapped to, e.g., immediately overlaid upon, the snap location 210. At this point in time, the snap-select function is completed, and the selected AR object 208c may be highlighted, or otherwise indicated to be selected. Then, the user may proceed with any desired edits or other actions that may be available for the selected AR object 208c.

In more detail, the snapping range 128 represents a distance from the cursor 126 at which the above-referenced snap-select function is executed. As such, the snapping range 128 may be expressed either in pixels in the context of the AR display 200, and/or in units of distance (e.g., millimeters) in the context of the corresponding physical space being represented in the AR display 200.

In FIGS. 1 and 2, the snapping range 128 is visible with respect to the cursor 126. In other implementations, the snapping range 128 need not be visibly displayed, or may be visibly displayed intermittently (such as when the cursor 126 moves within a certain distance of a snap location 210). Moreover, since the cursor 126 may be implemented in various fashions (e.g., different shapes or sizes), the snapping range 128 may similarly be determined or defined in any suitable, corresponding manner. For example, the snapping range 128 may be measured with respect to a center point of the cursor 126, even when the cursor is, for example, an arrow or other shape.

The example of AR objects 208a, 208b, 208c illustrate a fundamental advantage of the snap-select function, which is that it is not necessary for a user to be able to move the cursor 126 precisely to the snap location 210 in order to select the AR object 208a. Instead, the user has a margin of error defined by the snapping range 128, so that once the user is within the snapping range 128 of the snap location 210, as just described, the snap selector 134 may be configured to instantaneously and conveniently move the cursor 126 a rest of the distance to the snap location 210, without further action from the user being required.

These and related feature are advantageous for at least the reason that a precision of use of the cursor 126 may be limited in a manner that is not in full control of the user, or a designer of the AR application 112, or a manufacturer of the smartphone 102 (or other AR hardware/software). For example, any of the camera 104, the location engine 136, the sensor system 138, and/or the I/O system 140 may approach or experience limits in resolution or accuracy that may reflect, perhaps in combination with one another, in corresponding limits in movement or selection precision of the cursor 126.

As a result, a user attempting to overlay the cursor 126 itself precisely over the snap location 210 might experience frustration and inconvenience. For example, multiple attempts may be necessary. Although such difficulties may be mitigated by increasing the snapping range 128, other difficulties may arise from the snapping range 128 being too large. For example, an overly-large snapping range used when multiple AR objects are close to one another may result in the user inadvertently selecting an undesired AR object, in which case the user would be required to de-select the undesired AR object to make another selection attempt.

To avoid these and other difficulties and disadvantages, the snap selector 134 may dynamically adapt, tune, or otherwise adjust the snapping range 128, as described herein. In general, such adjustments to the snapping range 128 results in the snapping range being sufficiently large to execute a desired snap-select function (even when the selected AR object is relatively distant or otherwise difficult to select), while not being so large that undesired AR objects are inadvertently selected (such as when AR objects are close to the camera 104, and/or to one another).

In FIG. 2, the snap selector 134 of FIG. 1 may adjust the snapping range 128 based on the distance from the camera 104, as already referenced above with respect to FIG. 1. In the more specific example of FIG. 2, the zones 202-206 define distance ranges which at least partially dictate adjustments to the snapping range 128. For example, all other factors being equal, the snapping range 128 may be smallest when the cursor 126 is within the first zone 202, a standard/larger size when the cursor 126 is within the second zone 204, or, as already referenced, may be enlarged to the snapping range 130 within the third (most distant) zone 206 (e.g., in order to snap-select a distant AR object 212).

For example, the snap selector 134 may define a standard or default snap threshold, which may be set independently of other aspects of the system 100. In some implementations, the default snap threshold may be dependent on one or more factors, such as camera 104 or display 106 fidelity, an anticipated size of the physical space 114, or a desired function of the AR application 112. In the latter case, for example, an AR application directed to executing precise measurements may require a different default snap threshold than an AR application used to provide a virtual tour of a facility. Depending on these and other factors, the default snap threshold may be used by default within a particular zone (e.g., the first zone 202, or the second zone 204), and may be adjusted as the cursor 126 is moved to an adjacent zone. In other examples, the default snap threshold may represent a snapping range that is not required to be used by itself, but that provides a starting point for subsequent adjustments by the snap selector 134.

In the simplified example of FIG. 2, the zones 202-206 are illustrated as three separate, distinct zones. In such implementations the snapping range 128 may be adjusted each time the cursor 126 moves between zones, or appears (e.g., is instantiated) within a zone. In other examples, a different number of zones may be used, or distance-based adjustments to the snapping range 128 may be made in a continuous manner as the cursor 126 is moved.

As referenced, other factors besides, or in addition to, distance may be used to dynamically adjust the snapping range 128. For example, the snapping range 128 may be adjusted based on relative sizes of AR objects, as well. For example, when two AR objects are equidistant (or effectively equidistant, e.g., within a single zone of the zones 202-206 when using zone-based distance adjustments), the snapping range 128 may be increased based on, e.g., relative to, a size of an AR object to be selected.

For example, in FIG. 2, the first zone 202 includes an AR object 214 and an AR object 216, where the AR object 216 is larger than the AR object 214. In the example, any distance-based adjustment to the snapping range 128 would be the same for either AR object 214, 216 (since both are in the first zone 202). However, it may be convenient for the user to adjust the snapping range 128 to be larger for purposes of selecting the larger AR object 216, or to be smaller for purposes of selecting the AR object 214.

Therefore, the snap selector 134 may adjust the snapping range 128 based on relative sizes of AR objects. For example, the snapping range 128 may be set at least partially as a percentage of a size of an AR object, so that larger AR objects result in larger snapping ranges.

When a plurality of AR objects are included within the first zone 202, as shown in FIG. 2 with respect to AR objects 214, 216, then the snap selector 134 may use the AR object that is closer (or closest, if more than two) to the cursor 126 to determine such size-based adjustments. As with the distance-based adjustments already described, the size-based adjustments may be made with respect to, or in conjunction with, the default snap threshold.

Other factors may additionally or alternatively be used for snapping range adjustments. For example, a size of the cursor 126 may be used. For example, the snapping range 128 may be decreased as a size of the cursor 126 is increased, if the larger cursor size implies or provides increased cursor selection precision. Conversely, then, a smaller cursor 126 may require or benefit from a larger snapping range 128.

The snap selector 134 may use various algorithms, some examples of which are provided herein, to combine the above-referenced factors, or other factors, and otherwise to calculate snapping range adjustments as described herein. Such algorithms may be at least partially selectable and adjustable by the user, or by a designer of the AR application 112.

Figure 3:
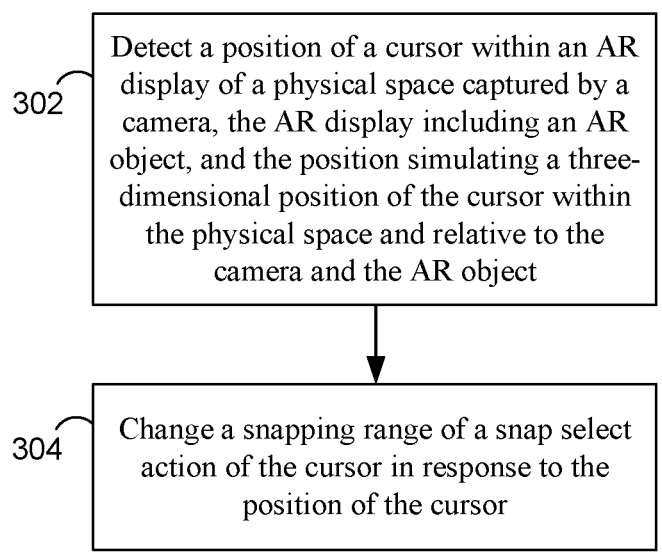
FIG. 3 is a flowchart illustrating example operations of the systems of FIGS. 1 and 2.

FIG. 3 is a flowchart 300 illustrating example operations of the systems of FIGS. 1 and 2. In the example of FIG. 3, a position of a cursor may be detected within an AR display of a physical space captured by a camera, the AR display including an AR object, and the position simulating a three-dimensional position of the cursor within the physical space and relative to the camera and the AR object (302). For example, the snap selector 134 of FIG. 1 may detect a position of the cursor 126 within the AR display 106 of FIG. 1, or within the AR display 200 of FIG. 2. The detected cursor position may be detected and otherwise expressed in x, y, z coordinates of a coordinate system used to map the AR display 106, 200 to a corresponding physical space, such as the physical space 114. In other words, an x, y, z, coordinate system of the physical space 114 may be mapped to a corresponding x, y, z coordinate system of the AR display 106 or 200, so that positions of imaged content within the physical space 114 may be correlated with the positions of the cursor 126 and any AR object. As referenced, the x, y, z coordinate system may be defined with respect to a camera used to generate the AR display 106, 200, such as the camera 204.

In the present description, the position of the cursor 126 may refer to, or include, any placement or movement of the cursor 126 within the AR display 106, 200. For example, a user may be provided with an ability to instantiate the cursor 126 at any specified position. In other examples, the user may simply move or re-locate the cursor 126 within and around the AR displays 106, 200. Thus, in combination, the user may instantiate the cursor 126 at a position, and thereafter move the cursor 126 to a second position.

A snapping range of a snap-select function of the cursor may then be changed in response to the position of the cursor (304). For example, as described herein, the snap selector 134 of FIG. 1 may execute one or more snap-select algorithms to calculate and dynamically adjust the snapping range 128, where such snap-select algorithms may include factors including, but not limited to, a distance of the cursor 126 from the camera 104, a distance of the AR object from the camera, a size of at least one AR object, a default snap threshold, and/or a size of the cursor, and various combinations of such factors. More specific examples of snap-select algorithms are provided below with respect to FIG. 4.

In implementations described herein, the position of the cursor 126 is determined relative to the camera 104, so that a corresponding distance of the cursor 126 from the camera 104 may be used to adjust the snapping range, as described. In alternative or additional implementations, the position of the cursor 126 may be determined relative to one or more AR object(s). Further, the snapping range may be adjusted based on a distance of one or more of the AR objects from the camera 104, rather than, or in addition to, the distance of the cursor 126 from the camera 104.

Figure 4:
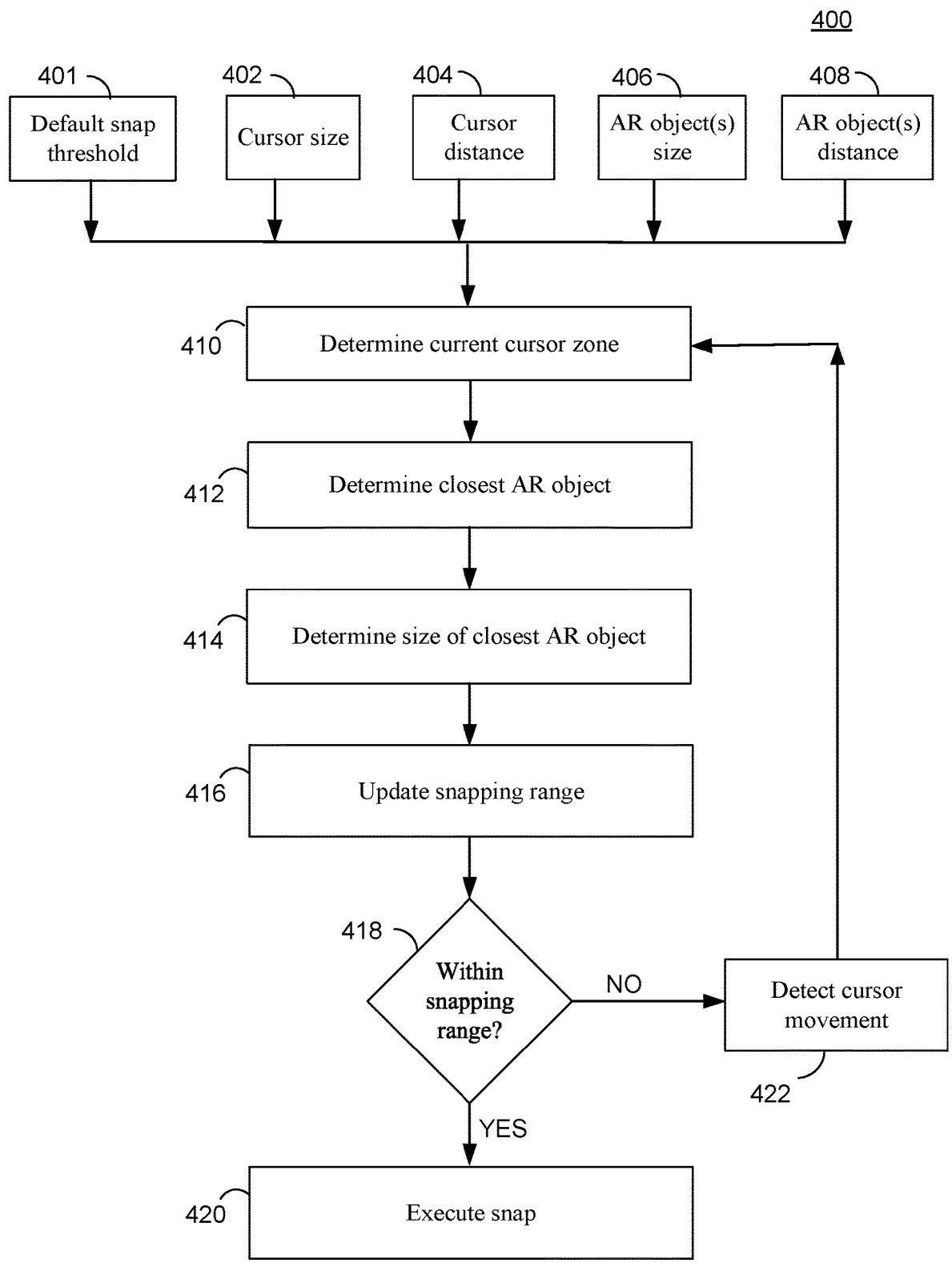
FIG. 4 is a flowchart illustrating more detailed example implementations of the systems of FIGS. 1 and 2.

FIG. 4 is a flowchart 400 illustrating more detailed example implementations of the systems of FIGS. 1 and 2. In FIG. 4, for example, the snap selector 134 of FIG. 1 may input, or have access to, a default snap threshold (401), as well as a cursor size (402) and cursor distance (404) within an AR display 106, 200. Each of the default snap threshold, cursor size and cursor distance may be adjustable by a user during normal operations of the AR system 100.

The snap selector 134 may also have access to relative sizes (406) and associated distances (408) of one or more AR objects. Again, a user may have varying degrees of control over a number, type, and placement of AR objects. In some cases, AR objects may be automatically generated and/or placed by the AR application 112 as part of operations of the AR application 112. For purposes of FIG. 4, it is assumed that the snap selector 134 has consistent and current access to the cursor size/distance and AR object size/distance.

As described below, it is not necessary that all of the inputs 401-408 be used. Moreover, additional inputs may be used. For example, it is not required to use the default snap threshold (401), and a snapping range may be calculated one some or all of the other available inputs. Further, other inputs may include empirically-determined adjustment factors, which may depend, for example, on various hardware and other parameters of the AR system 100.

In embodiments similar to those of FIG. 2, the snap selector 134 may initially determine a current cursor zone (410). For example, the snap selector 134 may determine a current distance of a position of the cursor 126 from the camera 104, such as by determining whether the cursor 126 is positioned within a particular one of the zones 202, 204, 206. As described, in alternative implementations, the current distance may also be determined as a measured distance of the position of the cursor 126 from the camera 104, without using pre-defined distance zones.

The snap selector 134 may determine a position of a closest AR object (412). For example, the snap selector 134 may determine a closest AR object from among two or more AR objects present within the AR display 106, 200. It may occur that the closest AR object is within the current zone of the cursor, or may be in a different zone.

The snap selector 134 may determine a size of the closest AR object (414). As described, in FIG. 4, such size information is assumed to be available as AR object(s) size (406), but in other implementations, the snap selector 134 may delay calculating or accessing AR object size information until a particular AR object has been determined to be a closest-available AR object.

Then, the snap selector 134 may proceed to update a snapping range of the cursor (416). As described, a number of algorithms may be used.

For example, algorithms may include calculations in which the snapping range is determined as a snapping range adjustment to the default snap threshold, in which the snapping range adjustment is in direct proportion to a distance and/or size of the AR object, while being in inverse proportion to a size of the cursor. Thus, a snapping range might be determined as shown in Eq. (1): (snapping range) =(default snap threshold)+[(AR object distance)(AR object size)/(cursor size)]

Eq. (1) may be implemented in a number of different manners. For example, the AR object distance may be implemented as an actual distance of an AR object. In other examples, each of the zones 202, 204, 206 of FIG. 2 may each be associated with a single distance factor, so that any AR object anywhere within a particular zone will be assigned the distance factor for that zone.

In other examples, the AR object size may be parameterized in a desired manner. For example, rather than using an actual size, some percentage or multiple of the AR object size may be used.

In still other examples, multiple versions of Eq. (1) may be used, depending on various design factors. For example, in the example of FIG. 2, each of the zones 202, 204, 206 may be associated with a different version or instance of Eq. (1).

For example, as described above, the zones 202, 204, 206 may be defined over distance ranges 0-a, a-b, b-c, respectively. Then, Eq. (1a) for the first zone 202 may be implemented as: (snapping range)=0.5(AR object size).

Eq. (1b) for the second zone 204 may be implemented as: (snapping range)=0.5(AR object size)(AR object distance).

Eq. (1c) for the third zone 206 may be implemented as: (snapping range)=0.5(AR object size)(empirical adjustment factor). As referenced, the empirical adjustment factor may be determined based on various hardware and other parameters, and through trial-and-error or other techniques to determine user preference.

Once the snapping range has been adjusted, a determination may be made as to whether the closest AR object (or a snapping location thereof) is within the adjusted snapping range (418). If so, then the snap-select function may be executed (420).

If not, then in the example of FIG. 4, subsequent cursor movement may be detected (422). The process 400 of FIG. 4 may continue, based on whether the cursor is moved from a current zone (410), and/or closer to a different AR object (412).

Figure 5:
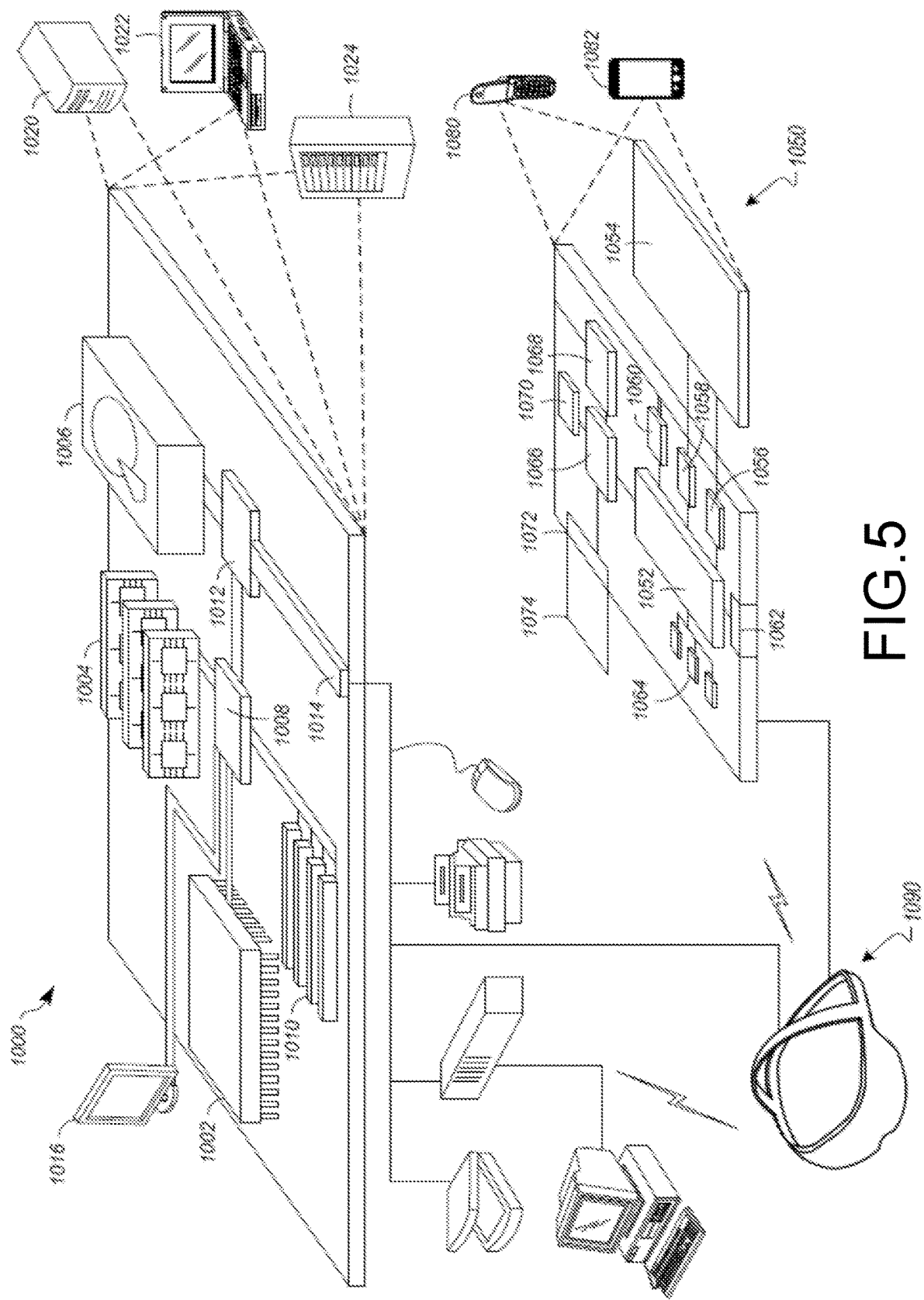
FIG. 5 shows an example of a computer device and a mobile computer device that can be used to implement the techniques described herein.

FIG. 5\*\*\* shows an example of a computer device 1000 and a mobile computer device 1050, which may be used with the techniques described here. Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a volatile memory unit or units. In another implementation, the memory 1004 is a non-volatile memory unit or units. The memory 1004 may also be another form of computer-readable medium, such as a magnetic or optical disk.

The storage device 1006 is capable of providing mass storage for the computing device 1000. In one implementation, the storage device 1006 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of functions is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Computing device 1050 includes a processor 1052, memory 1064, an input/output device such as a display 1054, a communication interface 1066, and a transceiver 1068, among other components. The device 1050 may also be provided with a storage device, such as a microdrive or other device, to provide additional storage. Each of the components 1050, 1052, 1064, 1054, 1066, and 1068, are interconnected using various buses, and several of the components may be mounted on a common motherboard or in other manners as appropriate.

The processor 1052 can execute instructions within the computing device 1050, including instructions stored in the memory 1064. The processor may be implemented as a chipset of chips that include separate and multiple analog and digital processors. The processor may provide, for example, for coordination of the other components of the device 1050, such as control of user interfaces, applications run by device 1050, and wireless communication by device 1050.

Processor 1052 may communicate with a user through control interface 1058 and display interface 1056 coupled to a display 1054. The display 1054 may be, for example, a TFT LCD (Thin-Film-Transistor Liquid Crystal Display) or an OLED (Organic Light Emitting Diode) display, or other appropriate display technology. The display interface 1056 may include appropriate circuitry for driving the display 1054 to present graphical and other information to a user. The control interface 1058 may receive commands from a user and convert them for submission to the processor 1052. In addition, an external interface 1062 may be provided in communication with processor 1052, so as to enable near area communication of device 1050 with other devices. External interface 1062 may provide, for example, for wired communication in some implementations, or for wireless communication in other implementations, and multiple interfaces may also be used.

The memory 1064 stores information within the computing device 1050. The memory 1064 can be implemented as one or more of a computer-readable medium or media, a volatile memory unit or units, or a non-volatile memory unit or units. Expansion memory 1074 may also be provided and connected to device 1050 through expansion interface 1072, which may include, for example, a SIMM (Single In-Line Memory Module) card interface. Such expansion memory 1074 may provide extra storage space for device 1050, or may also store applications or other information for device 1050. Specifically, expansion memory 1074 may include instructions to carry out or supplement the processes described above, and may include secure information also. Thus, for example, expansion memory 1074 may be provided as a security module for device 1050, and may be programmed with instructions that permit secure use of device 1050. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1064, expansion memory 1074, or memory on processor 1052, that may be received, for example, over transceiver 1068 or external interface 1062.

Device 1050 may communicate wirelessly through communication interface 1066, which may include digital signal processing circuitry where necessary. Communication interface 1066 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1068. In addition, short-range communication may occur, such as using a Bluetooth, Wi-Fi, or other such transceiver (not shown). In addition, GPS (Global Positioning System) receiver module 1070 may provide additional navigation- and location-related wireless data to device 1050, which may be used as appropriate by applications running on device 1050.

Device 1050 may also communicate audibly using audio codec 1060, which may receive spoken information from a user and convert it to usable digital information. Audio codec 1060 may likewise generate audible sound for a user, such as through a speaker, e.g., in a handset of device 1050. Such sound may include sound from voice telephone calls, may include recorded sound (e.g., voice messages, music files, etc.) and may also include sound generated by applications operating on device 1050.

The computing device 1050 may be implemented in a number of different forms, as shown in the figure. For example, it may be implemented as a cellular telephone 1080. It may also be implemented as part of a smartphone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (a LED (light-emitting diode), or OLED (organic LED), or LCD (liquid crystal display) monitor/screen) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the computing devices depicted in FIG. 10 can include sensors that interface with an AR headset/HMD device 1090 to generate an augmented environment for viewing inserted content within the physical space. For example, one or more sensors included on a computing device 1050 or other computing device depicted in FIG. 10, can provide input to the AR headset 1090 or in general, provide input to an AR space. The sensors can include, but are not limited to, a touchscreen, accelerometers, gyroscopes, pressure sensors, biometric sensors, temperature sensors, humidity sensors, and ambient light sensors. The computing device 1050 can use the sensors to determine an absolute position and/or a detected rotation of the computing device in the AR space that can then be used as input to the AR space. For example, the computing device 1050 may be incorporated into the AR space as a virtual object, such as a controller, a laser pointer, a keyboard, a weapon, etc. Positioning of the computing device/virtual object by the user when incorporated into the AR space can allow the user to position the computing device so as to view the virtual object in certain manners in the AR space. For example, if the virtual object represents a laser pointer, the user can manipulate the computing device as if it were an actual laser pointer. The user can move the computing device left and right, up and down, in a circle, etc., and use the device in a similar fashion to using a laser pointer.

In some implementations, one or more input devices included on, or connect to, the computing device 1050 can be used as input to the AR space. The input devices can include, but are not limited to, a touchscreen, a keyboard, one or more buttons, a trackpad, a touchpad, a pointing device, a mouse, a trackball, a joystick, a camera, a microphone, earphones or buds with input functionality, a gaming controller, or other connectable input device. A user interacting with an input device included on the computing device 1050 when the computing device is incorporated into the AR space can cause a particular action to occur in the AR space.

In some implementations, a touchscreen of the computing device 1050 can be rendered as a touchpad in AR space. A user can interact with the touchscreen of the computing device 1050. The interactions are rendered, in AR headset 1090 for example, as movements on the rendered touchpad in the AR space. The rendered movements can control virtual objects in the AR space.

In some implementations, one or more output devices included on the computing device 1050 can provide output and/or feedback to a user of the AR headset 1090 in the AR space. The output and feedback can be visual, tactical, or audio. The output and/or feedback can include, but is not limited to, vibrations, turning on and off or blinking and/or flashing of one or more lights or strobes, sounding an alarm, playing a chime, playing a song, and playing of an audio file. The output devices can include, but are not limited to, vibration motors, vibration coils, piezoelectric devices, electrostatic devices, light emitting diodes (LEDs), strobes, and speakers.

In some implementations, the computing device 1050 may appear as another object in a computer-generated, 3D environment. Interactions by the user with the computing device 1050 (e.g., rotating, shaking, touching a touchscreen, swiping a finger across a touch screen) can be interpreted as interactions with the object in the AR space. The actions could alter the display of content for a single user or for multiple users (e.g., a teacher or guide's actions may alter the display of content for all users participating in the virtual tour or field trip). In the example of the laser pointer in a AR space, the computing device 1050 appears as a virtual laser pointer in the computer-generated, 3D environment. As the user manipulates the computing device 1050, the user in the AR space sees movement of the laser pointer. The user receives feedback from interactions with the computing device 1050 in the AR environment on the computing device 1050 or on the AR headset 1090.

In some implementations, a computing device 1050 may include a touchscreen. For example, a user can interact with the touchscreen to interact with the AR environment. For example, the touchscreen may include user interface elements such as sliders that can control properties of the AR environment, such as the display properties associated with a display management entity. The user interface elements may also allow a user to switch how content is scaled (e.g., switching from scaling based on a relative scale to a real-world scale). Some implementations also respond to 2D touch screen gestures such as pinches or swipes to change the content (e.g., to scale, rotate, or switch content or display properties). For example, a user can interact with the touchscreen in a particular manner that can mimic what happens on the touchscreen with what happens in the AR space. For example, a user may use a pinching-type motion to zoom/scale content displayed on the touchscreen. This pinching-type motion on the touchscreen can cause information provided in the AR space to be zoomed/scaled. Additionally, in some implementations, the computing device 1050 may support 3D gestures in the physical world. For example, reaching the computing device 1050 out into a spatial volume defined by the size parameters of a display management entity may be interpreted as a particular input by the computing device 1050. Actuating a physical button, touchscreen virtual button, or other user actuatable input (e.g., a squeeze or shake motion) of the computing device may be recognized as another input by the computing device 1050. Some implementations treat combinations of these actions as gestures that correspond to commands within the AR environment. For example, some implementations may scale content in response to a user reaching out the computing device into a defined spatial volume, squeezing the computing device, and pulling the computing device back. As another example, a casting motion while holding the computing device 1050 may be recognized as a command to grab an item.

In some implementations, one or more input devices in addition to the computing device (e.g., a mouse, a keyboard) can be rendered in a computer-generated, 3D environment. The rendered input devices (e.g., the rendered mouse, the rendered keyboard) can be used as rendered in the AR space to control objects in the AR space.

Computing device 1000 is intended to represent various forms of digital computers and devices, including, but not limited to laptops, desktops, workstations, personal digital assistants, servers, blade servers, mainframes, and other appropriate computers. Computing device 1050 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

A number of embodiments have been described. Nevertheless, it will be understood that various modifications may be made without departing from the spirit and scope of the specification.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A non-transitory computer-readable storage medium comprising instructions stored thereon that, when executed by at least one processor, are configured to cause a computing system to at least:
    detect a position of a cursor within an AR display of a physical space captured by a camera, the AR display including an AR object, and the position simulating a three-dimensional position of the cursor within the physical space and relative to the camera and the AR object; and
    change a snapping range of a snap-select function of the cursor in response to the position of the cursor, including at least one of the following:
        increasing the snapping range in direct proportion to a distance of the cursor from the camera, as determined from the position of the cursor,
        increasing the snapping range in direct proportion to a size of the AR object within the AR display, or
        changing the snapping range in inverse proportion to a size of the cursor.

2. The non-transitory computer-readable storage medium of claim 1, wherein the instructions, when executed by the at least one processor, cause the computing system to detect the position including:
    detecting a movement of the cursor within the AR display.

3. The non-transitory computer-readable storage medium of claim 1, wherein the instructions, when executed by the at least one processor, cause the computing system to detect the position including:
    detecting the position of the cursor within one of a plurality of pre-defined distance zones that are defined with respect to the camera.

4. The non-transitory computer-readable storage medium of claim 1, wherein the instructions, when executed by the at least one processor, cause the computing system to detect the position including:
    detect a plurality of AR objects within the AR display, including the AR object; and
    determine that the AR object is the closest of the plurality of AR objects to the position of the cursor.

5. The non-transitory computer-readable storage medium of claim 1, wherein the instructions, when executed by the at least one processor, cause the computing system to change the snapping range including:
    increasing the snapping range in direct proportion to the distance of the cursor from the camera and in direct proportion to the size of the AR object within the AR display.

6. The non-transitory computer-readable storage medium of claim 1, wherein the instructions, when executed by the at least one processor, cause the computing system to change the snapping range including:
    increasing the snapping range in direct proportion to the size of the AR object within the AR display and in inverse proportion to the size of the cursor.

7. The non-transitory computer-readable storage medium of claim 1, wherein the instructions, when executed by the at least one processor, cause the computing system to change the snapping range including:
increasing the snapping range in direct proportion to the distance of the cursor from the camera; and
changing the snapping range in inverse proportion to the size of the cursor.

8. The non-transitory computer-readable storage medium of claim 1, wherein the instructions, when executed by the at least one processor, cause the computing system to:
detect a current distance of the cursor from the camera, based on the position of the cursor;
detect the size of the AR object; and
change the snapping range based on a combination of the current distance and the size.

9. A method comprising:
detecting a position of a cursor within an AR display of a physical space captured by a camera, the AR display including an AR object, and the position simulating a three-dimensional position of the cursor within the physical space and relative to the camera and the AR object; and
changing a snapping range of a snap-select function of the cursor in response to the position of the cursor, including at least one of the following:
increasing the snapping range in direct proportion to a distance of the cursor from the camera, as determined from the position of the cursor,
increasing the snapping range in direct proportion to a size of the AR object within the AR display, or
changing the snapping range in inverse proportion to a size of the cursor.

10. The method of claim 9, wherein detecting the position comprises:
detecting a plurality of AR objects within the AR display, including the AR object; and
determining that the AR object is the closest of the plurality of AR objects to the position of the cursor.

11. The method of claim 9, wherein changing the snapping range comprises:
increasing the snapping range in direct proportion to the distance of the cursor from the camera, as determined from the position of the cursor; and
increasing the snapping range in direct proportion to the size of the AR object within the AR display.

12. The method of claim 9, wherein changing the snapping range comprises:
increasing the snapping range in direct proportion to the size of the AR object within the AR display and in inverse proportion to the size of the cursor.

13. The method of claim 9, wherein changing the snapping range comprises:
changing the snapping range in direct proportion to the distance of the AR object from the camera; and
changing the snapping range in inverse proportion to the size of the cursor.

14. The method of claim 9, further comprising:
detecting a current distance of the cursor from the camera, based on the position of the cursor;
detecting the size of the AR object; and
changing the snapping range based on a combination of the current distance and the size.

15. A system comprising:
at least one processor; and
memory storing instructions that, when executed by the at least one processor, cause the system to:
detect a position of a cursor within an AR display of a physical space captured by a camera, the AR display including an AR object, and the position simulating a three-dimensional position of the cursor within the physical space;
determine, from the position of the cursor, a distance of the cursor from the camera within the AR display; and
change a snapping range of a snap-select function of the cursor based on the distance of the cursor from the camera, including at least one of the following:
increasing the snapping range in direct proportion to a distance of the cursor from the camera, as determined from the position of the cursor,
increasing the snapping range in direct proportion to a size of the AR object within the AR display, or
changing the snapping range in inverse proportion to a size of the cursor.

16. The system of claim 15, wherein the instructions, when executed by the at least one processor, cause the system to:
change the snapping range based on the size of the AR object; and
change the snapping range in inverse proportion to the size of the cursor.

17. The system of claim 16, wherein the instructions, when executed by the at least one processor, cause the system to:
change the snapping range in direct proportion to a combination of the distance of the cursor from the camera and the size of the AR object.

18. The system of claim 15, wherein the instructions, when executed by the at least one processor, cause the system to:
detect a plurality of AR objects within the AR display, including the AR object; and
determine that the AR object is the closest of the plurality of AR objects to the position of the cursor.

* * * * *